(12) United States Patent
Velazquez

(10) Patent No.: US 9,735,609 B2
(45) Date of Patent: Aug. 15, 2017

(54) CHARGING APPARATUS

(71) Applicant: ELATION LIGHTING, INC., Los Angeles, CA (US)

(72) Inventor: Toby Velazquez, Yorba Linda, CA (US)

(73) Assignee: Elation Lighting, Inc., Los Angeles, CA (US)

(*) Notice: Subject to any disclaimer, the term of this patent is extended or adjusted under 35 U.S.C. 154(b) by 129 days.

(21) Appl. No.: 14/739,970

(22) Filed: Jun. 15, 2015

(65) Prior Publication Data

US 2016/0099603 A1 Apr. 7, 2016

Related U.S. Application Data

(60) Provisional application No. 62/060,443, filed on Oct. 6, 2014.

(51) Int. Cl.
*H02J 7/02* (2016.01)
*H02J 7/00* (2006.01)
*H02J 50/10* (2016.01)
*H02J 50/20* (2016.01)
*H02J 50/12* (2016.01)

(52) U.S. Cl.
CPC ............ *H02J 7/025* (2013.01); *H02J 7/0027* (2013.01); *H02J 50/10* (2016.02); *H02J 50/20* (2016.02); *H02J 7/0042* (2013.01); *H02J 50/12* (2016.02)

(58) Field of Classification Search
CPC .. H02J 7/025; H02J 50/10; H02J 50/20; H02J 7/0027; H02J 50/12; H02J 7/0042; F21V 15/01; F21V 99/00; F21L 4/00
See application file for complete search history.

(56) References Cited

U.S. PATENT DOCUMENTS 8,210,708 B2 * 7/2012 Hau ........................ F21S 6/001
320/108

* cited by examiner

*Primary Examiner* — Bao Q Truong
(74) *Attorney, Agent, or Firm* — Sherman IP LLP; Kenneth L. Sherman; Hemavathy Perumal

(57) ABSTRACT

Embodiments of the present invention provide a charging apparatus comprising a case comprising at least one compartment capable of storing a battery-powered lighting device and at least one charging base capable of charging the battery-powered lighting device, wherein each charging base resides in a separate compartment of the case. Each compartment in the case is capable of receiving and storing a battery-powered lighting device in more than one orientation. Each charging base further comprises a charging interface system shaped to engage with and charge a battery-powered lighting device in at least two orientations, and a mounting system interface shaped to engage with and securely mount a battery-powered lighting device to the charging base in at least two orientations. The charging interface system is capable of providing an electrical current to the battery-powered lighting device in a variety of formats, including inductive, conductive and radio frequency charging.

12 Claims, 6 Drawing Sheets

CHARGING APPARATUS

CROSS-REFERENCE TO RELATED APPLICATIONS

This application claims priority to United States (U.S.) Provisional Patent Application Ser. No. 62/060,443 filed on Oct. 6, 2014, which is incorporated herein by reference.

BACKGROUND OF THE INVENTION

Field of the Invention

The present invention relates generally to a charging apparatus, and in particular, a charging apparatus capable of transporting, storing and charging battery-powered lighting devices in at least two insertion orientations.

Description of Related Art

Lighting apparatuses are used for illuminating both indoor and outdoor environments. Proper illumination is vital when filming movies, television shows, shooting videos, taking photographs, lighting live stage performances, and other similar activities.

BRIEF SUMMARY OF THE INVENTION

Embodiments of the present invention provide a charging apparatus comprising a case comprising at least one compartment capable of storing a battery-powered lighting device and at least one charging base capable of charging the battery-powered lighting device, wherein each charging base resides in a separate compartment of the case. Each compartment in the case is capable of receiving and storing a battery-powered lighting device in more than one orientation. Each charging base further comprises a charging interface system shaped to engage with and charge a battery-powered lighting device in at least two orientations, and a mounting system interface shaped to engage with and securely mount a battery-powered lighting device to the charging base in at least two orientations. The charging interface system is capable of providing an electrical current to the battery-powered lighting device in a variety of formats, including inductive, conductive and radio frequency charging.

In one embodiment, the charging interface system provides electrical current to a battery-powered lighting device residing thereon by inductive coupling. In an alternative embodiment, the charging interface system provides electrical current to a battery-powered lighting device residing thereon by conductive charging. In yet another embodiment, the charging interface system provides electrical current to a battery-powered lighting device residing thereon by radio frequency charging. Regardless of the charging format, the case is capable of providing electrical current to each of the charging bases therein, the electrical current originating from an external source. In an alternative embodiment, the case is capable of providing electrical current to each of the charging bases therein, the electrical current originating from a source internal to the case.

These and other features, aspects and advantages of the present invention will become understood with reference to the following description, appended claims and accompanying figures.

DETAILED DESCRIPTION OF THE INVENTION

Embodiments of the present invention provide a charging apparatus comprising a case comprising at least one compartment capable of storing a battery-powered lighting device and at least one charging base capable of charging the battery-powered lighting device, wherein each charging base resides in a separate compartment of the case. Each compartment in the case is capable of receiving and storing a battery-powered lighting device in more than one orientation.

Each charging base further comprises a charging interface system shaped to engage with and charge a battery-powered lighting device in at least two orientations, and a mounting system interface shaped to engage with and securely mount a battery-powered lighting device to the charging base in at least two orientations. The charging interface system is capable of providing an electrical current to the battery-powered lighting device in a variety of formats.

In one embodiment, the charging interface system provides electrical current to a battery-powered lighting device residing thereon by inductive coupling. In an alternative embodiment, the charging interface system provides electrical current to a battery-powered lighting device residing thereon by conductive charging. In yet another embodiment, the charging interface system provides electrical current to a battery-powered lighting device residing thereon by radio frequency charging.

Regardless of the charging format, the case is capable of providing electrical current to each of the charging bases therein, the electrical current originating from an external source. In an alternative embodiment, the case is capable of providing electrical current to each of the charging bases therein, the electrical current originating from a source internal to the case.

Each charging base is capable of indicating whether a battery-powered lighting device is charging. Further, each charging base is capable of indicating whether a battery-powered lighting device is fully charged.

Figure 1:
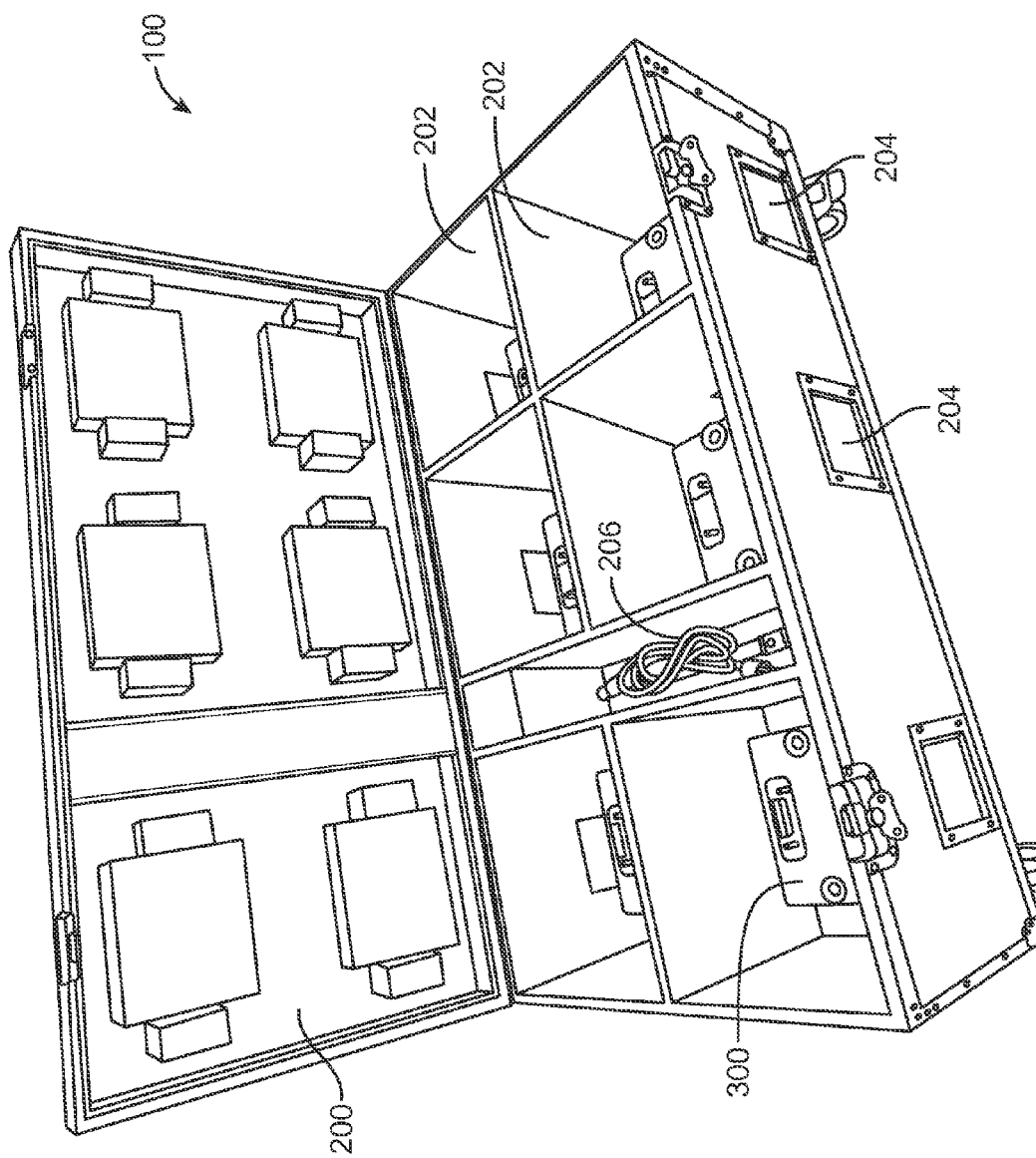
FIG. 1 illustrates a charging apparatus, in accordance with an embodiment of the present invention.
Figure 4:
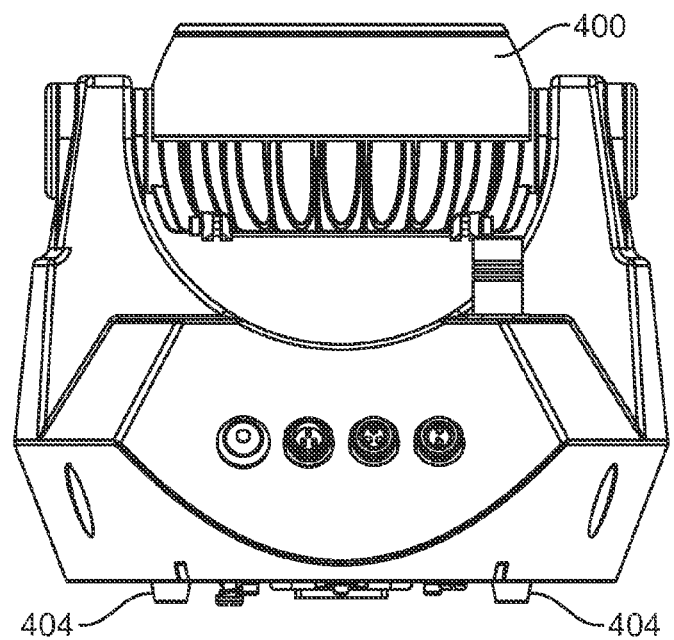
FIG. 4 illustrates a side view of a battery-powered lighting device, in accordance with an embodiment of the invention.

FIG. 1 illustrates a charging apparatus 100, in accordance with an embodiment of the present invention. The charging apparatus 100 comprises a case 200 comprising at least one compartment 202 capable of storing a battery-powered lighting device 400 (FIG. 4). The apparatus 100 further comprises at least one charging base 300 capable of charging the battery-powered lighting device 400. Each charging base 300 in the apparatus 100 resides in a separate compartment 202 within the case 200. The internal surfaces of each compartment 202 are configured in such a way so as to allow insertion and storage of a battery-powered lighting device 400 in at least two different orientations.

Residing at the bottom of each compartment 202 is a charging base 300. Each charging base 300 is capable of providing electrical current to a battery-powered lighting device 400 that is inserted into the compartment 202 and orientated in such a way to correspond with the charging interface system 302 (FIG. 3) and mounting interface system 304 (FIG. 3) of the charging base 300.

Figure 2:
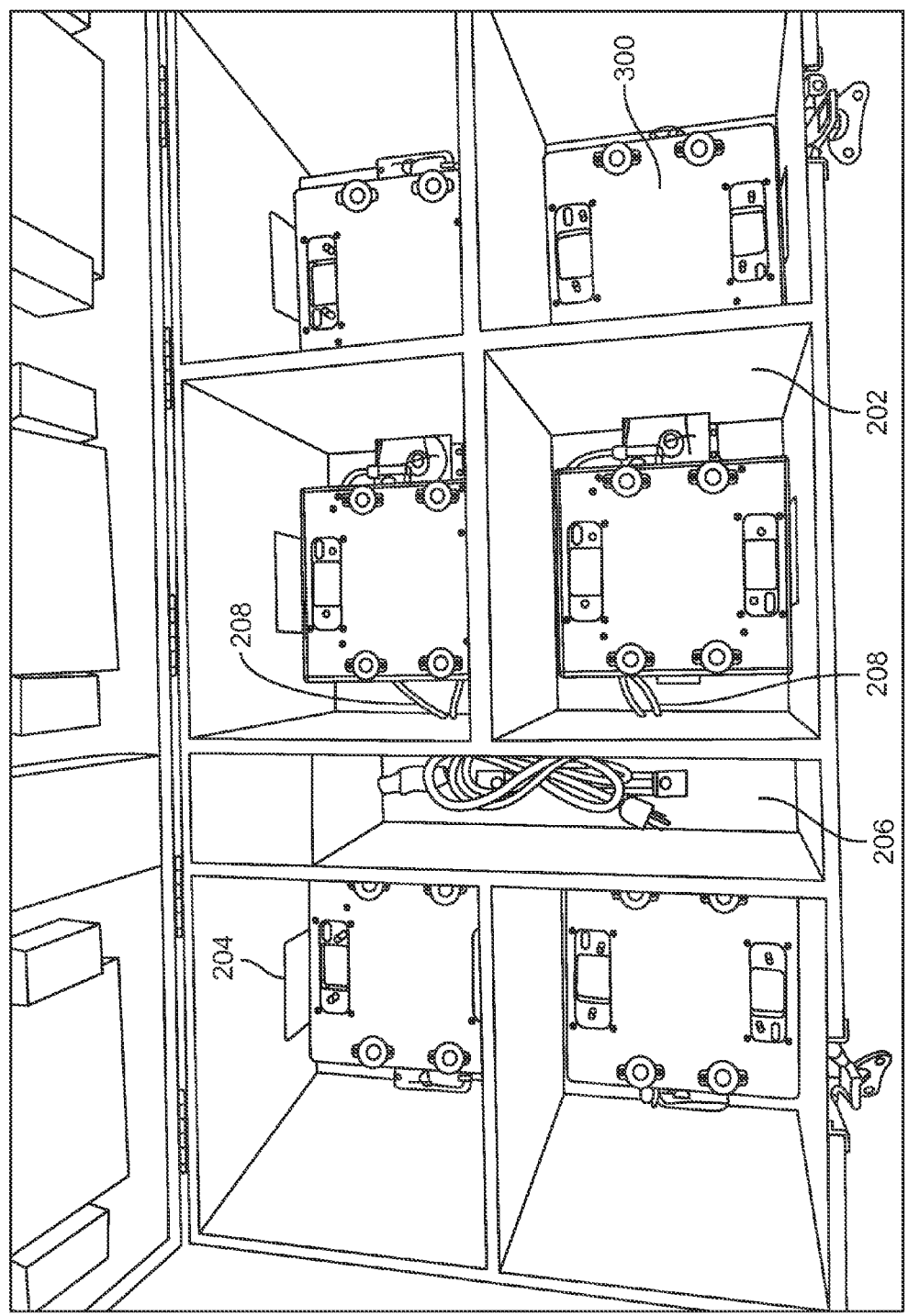
FIG. 2 illustrates a top-down view of the charging apparatus, in accordance with an embodiment of the present invention.

The case 200 further comprises a storage compartment 206 where accessories related to the case 200 and battery-powered lighting devices 400 may be stored. In one embodiment of the invention, the storage compartment 206 further comprises a means for connecting the case 200 to an external power source in order to provide electrical current to the battery-operating lighting devices 400 via the charging bases 300. In an alternative embodiment, the case 200 further comprises an internal power source which provides electrical current to the battery-powered lighting devices 400 via the charging bases 300. In one embodiment, the case 200 provides electrical current to each of the charging bases 300 in each of the compartments 202 by electrical cables 208 (FIG. 2). In an alternative embodiment, each charging base 300 interfaces directly with an internal power source residing in the case 200 without need for electrical cables 208.

The case 200 further comprises at least one viewing port 204 providing a means, while the case is closed, for determining whether a battery-powered lighting device 400 is inserted into a specific compartment, 202, whether the battery-powered lighting device 400 is charging or whether it is fully charged. Essentially, the viewing port 204 provides visual access to the charging status indicator 308 (FIG. 3) on the side surface of a charging base 300.

Figure 3:
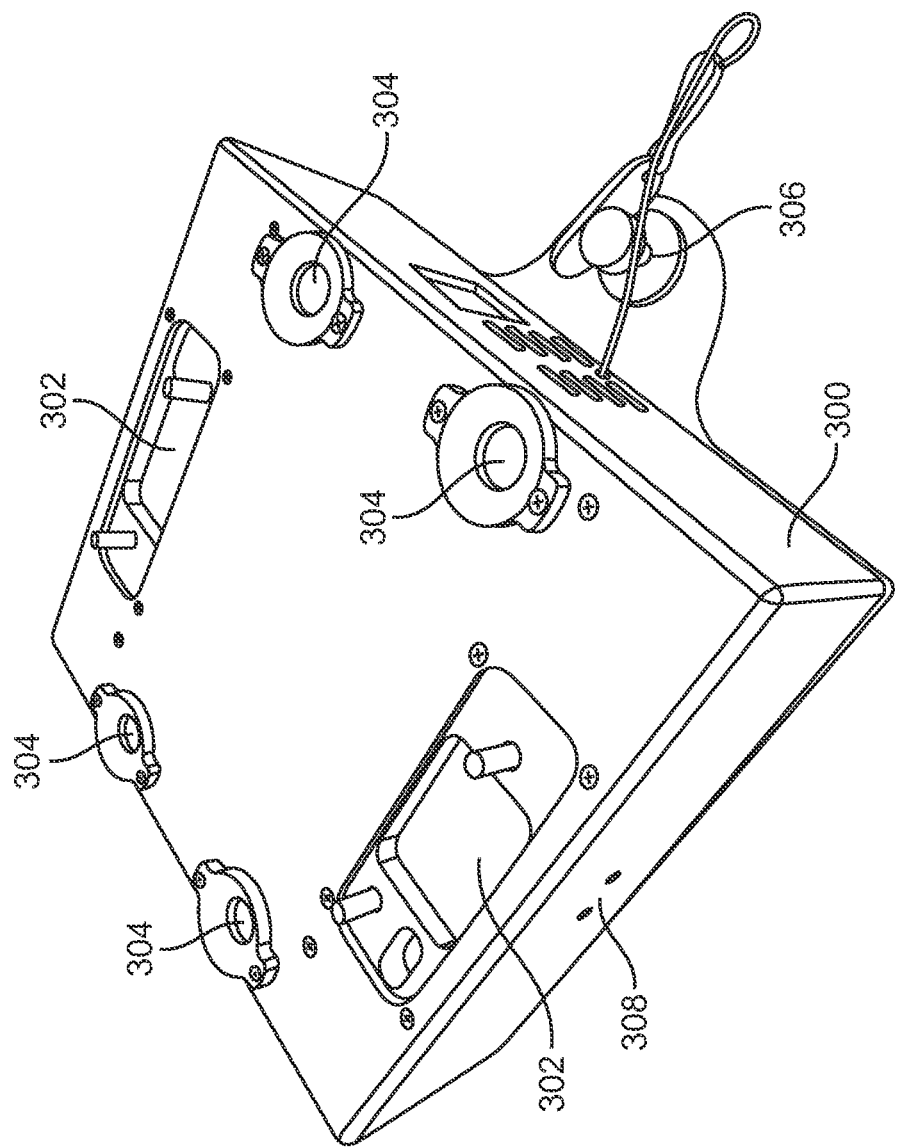
FIG. 3 illustrates a perspective view of a charging base, in accordance with an embodiment of the invention.

FIG. 2 illustrates a top-down view of the charging apparatus 100, in accordance with an embodiment of the present invention. FIG. 2 details how each charging base 300 resides at the bottom of each compartment 202 in the case 200. Each charging base 300 is removably connected to the bottom of each compartment 202 via an engaging mechanism 306 (FIG. 3). FIG. 2 also details the orientation of each viewing ports 204 relative to the compartment 202 in the case. Each viewing port 204 provides a means for viewing into a compartment 202 while the case 204 is closed. The storage compartment 206 is also visible in the top-down view depicted in FIG. 2.

FIG. 3 illustrates a perspective view of a charging base 300, in accordance with an embodiment of the invention. The top surface of each charging base 300 comprises a charging interface system 302 shaped to engage with and charge a battery-powered lighting device 400 in at least two different orientations. The top surface of each charging base 300 also comprises a mounting system interface 304 shaped to engage with and securely mount a battery-powered lighting device 400 to said charging base 300 in at least two different orientations.

Residing on a side of the charging base 300 is the charging status indicator 308. In one embodiment, the charging status indicator 308 comprises a plurality of light emitting diodes (LEDs) that display different colors and/or patterns depending on whether a battery-powered lighting device 400 connected to the charging interface system 302 is charging and/or fully charged. In an alternative embodiment, the charging status indicator 308 may be a screen (e.g., liquid crystal display) or similar device providing information as to the status of the charge for a battery-powered lighting device 400 in contact with the charging interface system 302 of a charging base 300.

The charging base 300 further comprises an engaging mechanism 306 for removably connecting the charging base 300 to the bottom surface of a compartment 202 within the case 200. In one embodiment, each charging base 300 is removably connected to the bottom of each compartment 202 of the case 200 via an engaging mechanism 306. In an alternative embodiment, each charging base 300 is permanently affixed to the bottom of each compartment 202 in the case 200.

Figure 5:
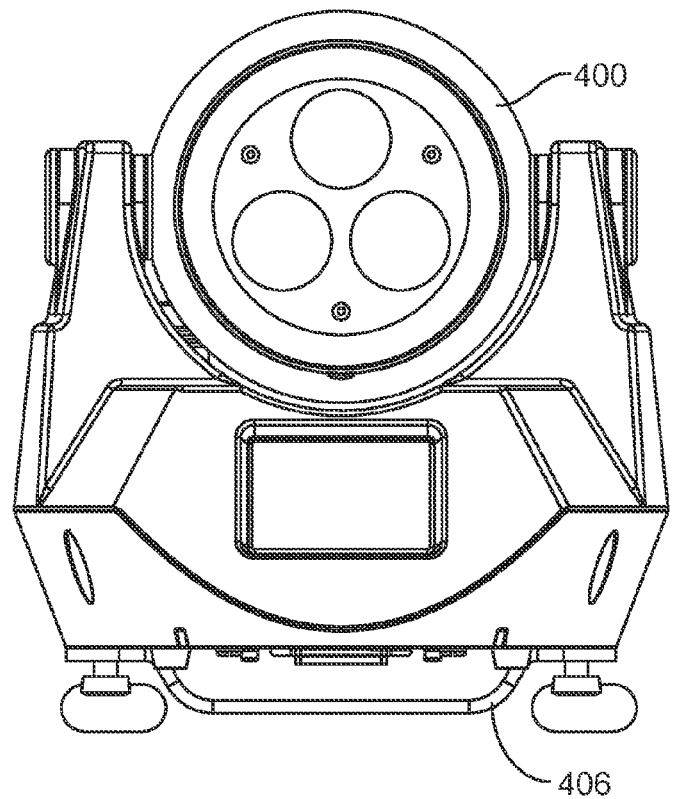
FIG. 5 illustrates an alternative side view of the battery-powered lighting device, in accordance with an embodiment of the invention.

FIG. 4 illustrates a side view of a battery-powered lighting device 400, in accordance with an embodiment of the invention. The battery-powered lighting device 400 depicted in FIG. 4 comprises at least two feet 404 which correspond with a mounting system 304 on the top surface of a charging base 300. The feet 404 may also provide stability to the battery-powered lighting device when it is placed on a flat surface. The feet 404 also prevent charging connection points 402 (FIG. 6) from being damaged and/or coming in contact with the surface upon which the battery-powered lighting device 400 may be placed. FIG. 5 illustrates an alternative side view of the battery-powered lighting device 400, in accordance with an embodiment of the invention. FIG. 5 details an embodiment of the invention where the lighting device 400 comprises a mounting bracket 406 capable of allowing the battery-powered lighting device 400 to be mounted to a structure (e.g., truss structure) in an inverted orientation. In this embodiment, a charging base 300 would have a recess transverse between the charging interface systems 302 which corresponds to the mounting bracket 406. This design would allow the battery-powered lighting device 400 to correspond with the charging interface system 302 of a charging base 300 without having to remove the mounting bracket 406.

Figure 6:
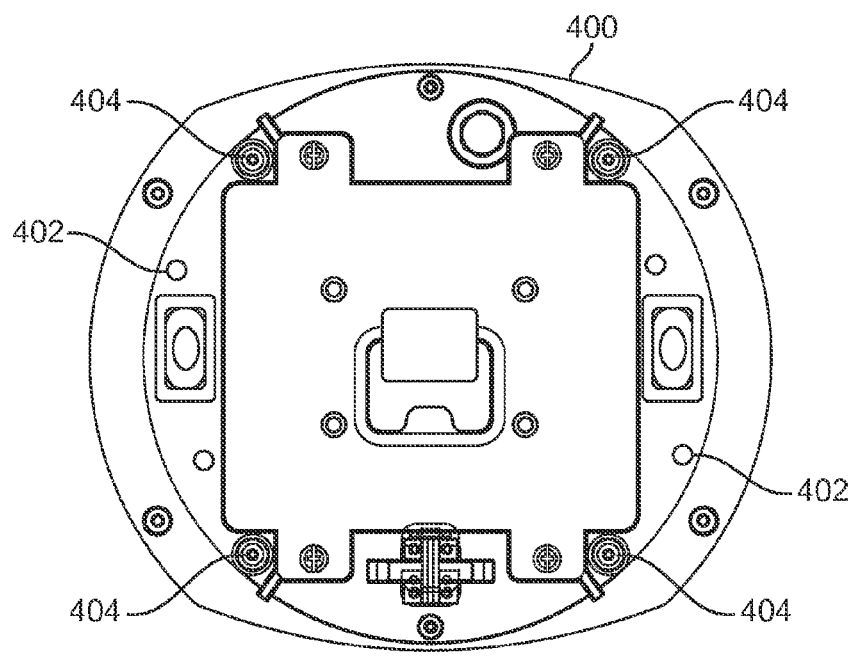
FIG. 6 illustrates a bottom view of the battery-powered lighting device, in accordance with an embodiment of the invention.
Figure 7:
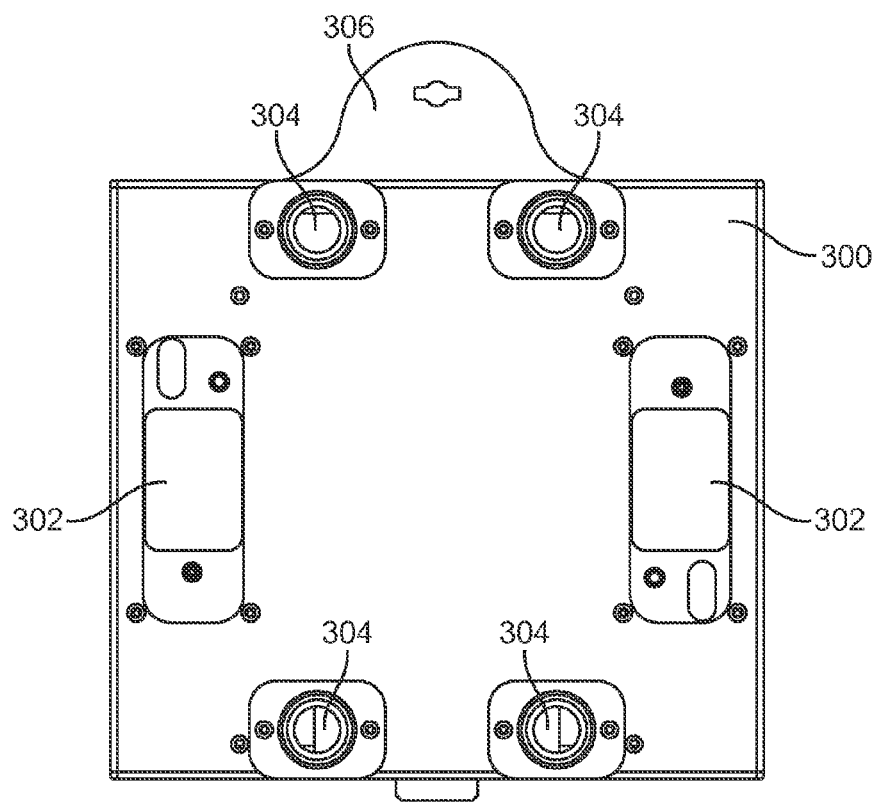
FIG. 7 illustrates a top view of the charging base, in accordance with an embodiment of the invention.
Figure 8:
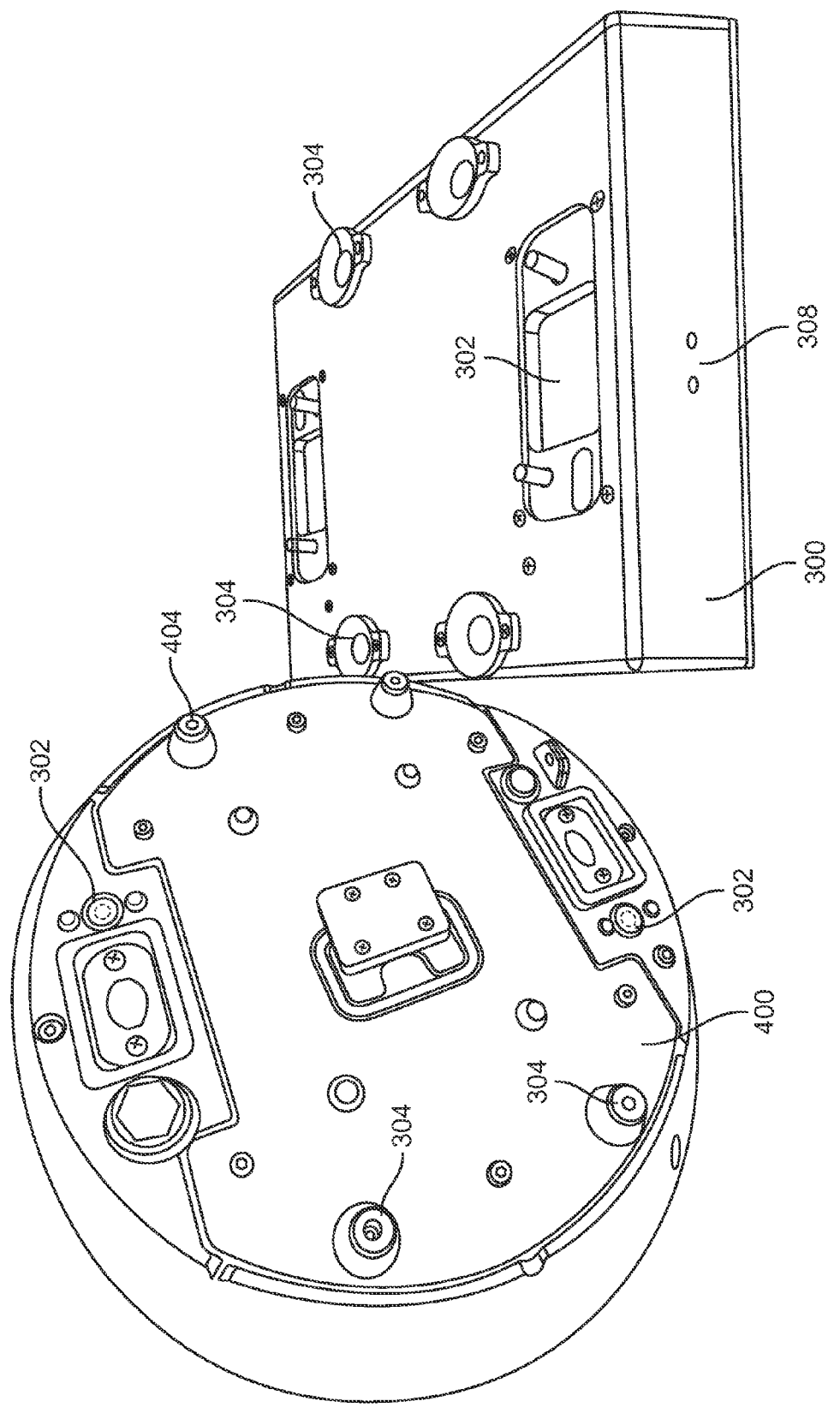
FIG. 8 illustrates an alternative view of the battery-powered lighting device and charging base, in accordance with an embodiment of the present invention.

FIG. 6 illustrates a bottom view of the battery-powered lighting device 400, in accordance with an embodiment of the invention. FIG. 7 illustrates a top view of the charging base 300, in accordance with an embodiment of the invention. FIG. 8 illustrates an alternative view of the battery-powered lighting device 400 and charging base 300, in accordance with an embodiment of the present invention. In the embodiment illustrated in FIG. 6, the charging connection points 402 reside perpendicular to the feet 404 of the battery-powered lighting device 400. In an alternative embodiment, the charging connection points 402 may be parallel to and/or transverse to the feet 404, sufficient that the battery-powered lighting device 400 is capable of being charged by a charging base 300 in at least two different orientations.

The feet 404 are positioned along the bottom of the battery-powered lighting device 400 such that each corresponds to one of the mounting systems 304 on the top surface of a charging base 300 (FIG. 7). This feature ensures that each of the charging connection points 402 correspond with the charging interface systems 302 located on the top surface of the charging base 300. This also ensures the battery-powered lighting device 400 does not rotate about the charging base 300 or within the compartment 202 of the case 200, while in transit or during charging.

In one embodiment of the present invention, the charging base 300 provides an electrical current to the battery-powered lighting device 400 by means of inductive charging. In an alternative embodiment, the charging base 300 provides an electrical current to the battery-powered lighting device 400 by means of conductive charging. In yet another embodiment, the charging base 300 provides an electrical current to the battery-powered lighting device 400 by means of resonant inductive coupling or electrodynamic induction. In another embodiment, the charging base 300 provides an electrical current to the battery-powered lighting device 400 by means of radio frequency-based charging.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A charging apparatus, comprising:
a case comprising at least one compartment capable of storing a battery-powered lighting device; and
at least one charging base capable of charging the battery-powered lighting device, comprising:
    a charging interface system shaped to engage with and charge a battery-powered lighting device in at least two orientations; and
    a mounting system interface shaped to engage with and securely mount a battery-powered lighting device to said charging base in at least two orientations;
wherein:
    each charging base resides in a separate compartment of the case; and
    each compartment in the case is capable of receiving and storing a battery-powered lighting device in more than one orientation.

2. The charging apparatus of claim 1, wherein:
the charging interface system is capable of providing an electrical current to a battery-powered lighting device via inductive charging.

3. The charging apparatus of claim 1, wherein:
the charging interface system is capable of providing an electrical current to a battery-powered lighting device via conductive charging.

4. The charging apparatus of claim 1, wherein:
the charging interface system is capable of providing an electrical current to a battery-powered lighting device via radio frequency charging.

5. The charging apparatus of claim 1, wherein:
each charging base is capable of indicating whether a battery-powered lighting device residing thereon is charging; and
each charging base is capable of indicating whether a battery-powered lighting device residing thereon is fully charged.

6. The charging apparatus of claim 1, wherein:
the case is capable of providing electrical current to each of the charging bases residing therein.

7. A charging system, comprising:
a plurality of battery-powered lighting devices; and
a least one charging apparatus;
each charging apparatus comprising:
    a case comprising at least one compartment capable of storing one of the plurality of battery-powered lighting devices; and
    at least one charging base capable of charging the battery-powered lighting device, comprising:
        a charging interface system shaped to engage with and charge one of the battery-powered lighting devices in at least two orientations; and
        a mounting system interface shaped to engage with and securely mount one of the battery-powered lighting devices to said charging base in at least two orientations;
    wherein:
        each charging base resides in a separate compartment of the case; and
        each compartment in the case is capable of receiving and storing one of the battery-powered lighting device in more than one orientation.

8. The charging system of claim 7, wherein:
the charging interface system is capable of providing an electrical current to one of the battery-powered lighting devices via inductive charging.

9. The charging system of claim 7, wherein:
the charging interface system is capable of providing an electrical current to one of the battery-powered lighting devices via conductive charging.

10. The charging system of claim 7, wherein:
the charging interface system is capable of providing an electrical current to one of the battery-powered lighting devices via radio frequency charging.

11. The charging system of claim 7, wherein:
each charging base is capable of indicating whether one of the battery-powered lighting devices residing thereon is charging; and
each charging base is capable of indicating whether one of the battery-powered lighting devices residing thereon is fully charged.

12. The charging system of claim 7, wherein:
the case is capable of providing electrical current to each of the charging bases residing therein.

* * * * *